May 8, 1951 M. E. STANLEY 2,552,297
ORNAMENTAL CAKE PLATTER
Filed May 18, 1950 3 Sheets-Sheet 1

Mary E. Stanley
INVENTOR.

May 8, 1951  M. E. STANLEY  2,552,297
ORNAMENTAL CAKE PLATTER
Filed May 18, 1950  3 Sheets-Sheet 2

Mary E. Stanley
INVENTOR.

May 8, 1951  M. E. STANLEY  2,552,297
ORNAMENTAL CAKE PLATTER
Filed May 18, 1950  3 Sheets-Sheet 3
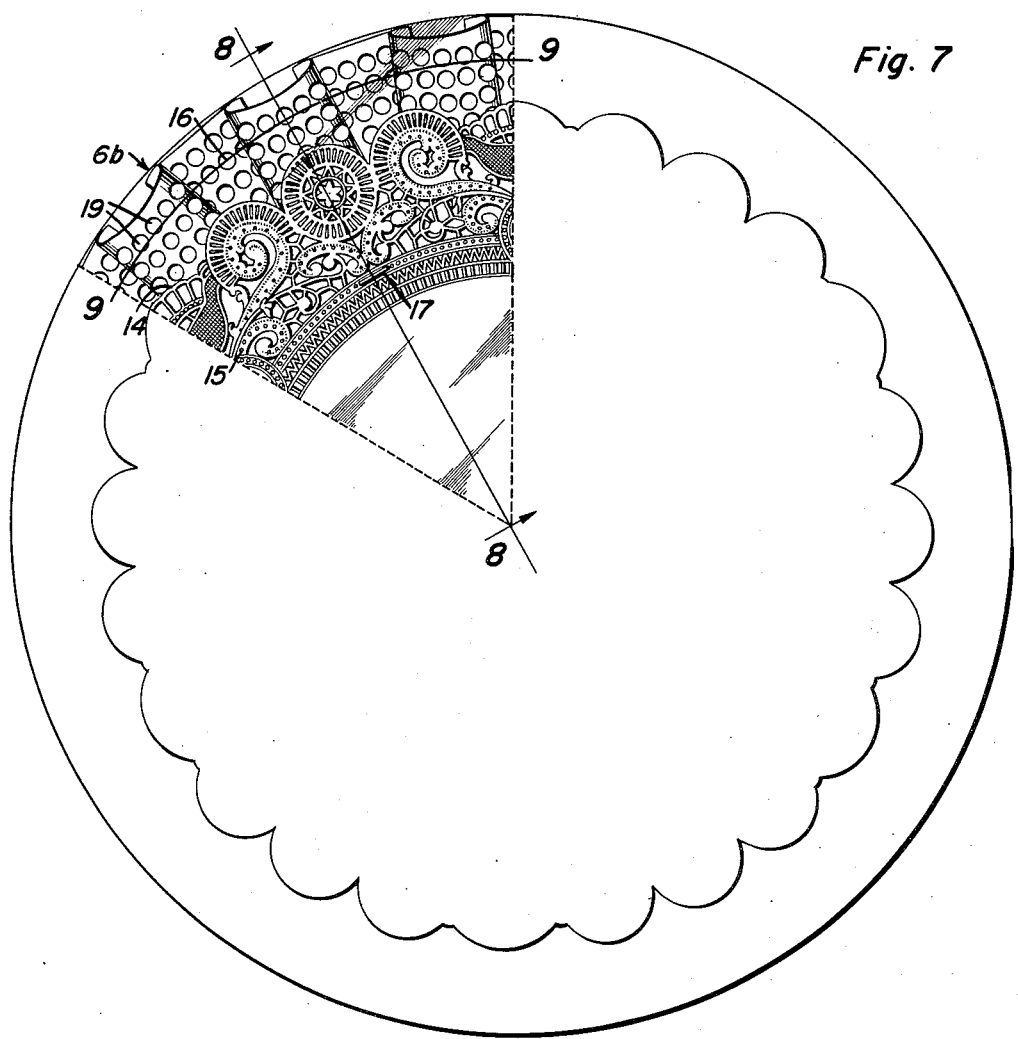
Fig. 7
Fig. 8
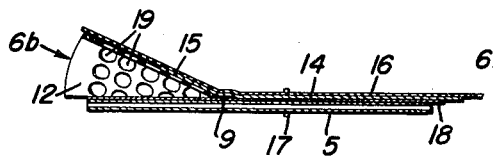
Fig. 9
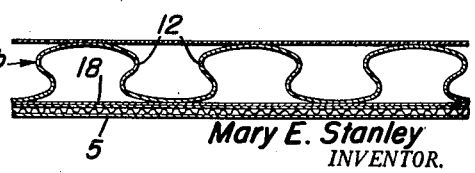
Mary E. Stanley
INVENTOR.

Patented May 8, 1951

2,552,297

UNITED STATES PATENT OFFICE 2,552,297

ORNAMENTAL CAKE PLATTER

Mary E. Stanley, Rockingham, N. C.

Application May 18, 1950, Serial No. 162,637

6 Claims. (Cl. 41—10)

This invention relates to a novel cake platter, and the primary object of the invention is to provide such a platter which is highly attractive and ornamental in appearance, and which may be readily and cheaply made by the use of certain materials and conventional articles combined and arranged in a particular relation.

Another object is to provide a platter of the above kind on which the cake may be readily sliced, and on which the cake and cake crumbs will be effectively retained.

The nature of the invention will be apparent from the following description when considered with the accompanying drawings, in which.

Figure 4:
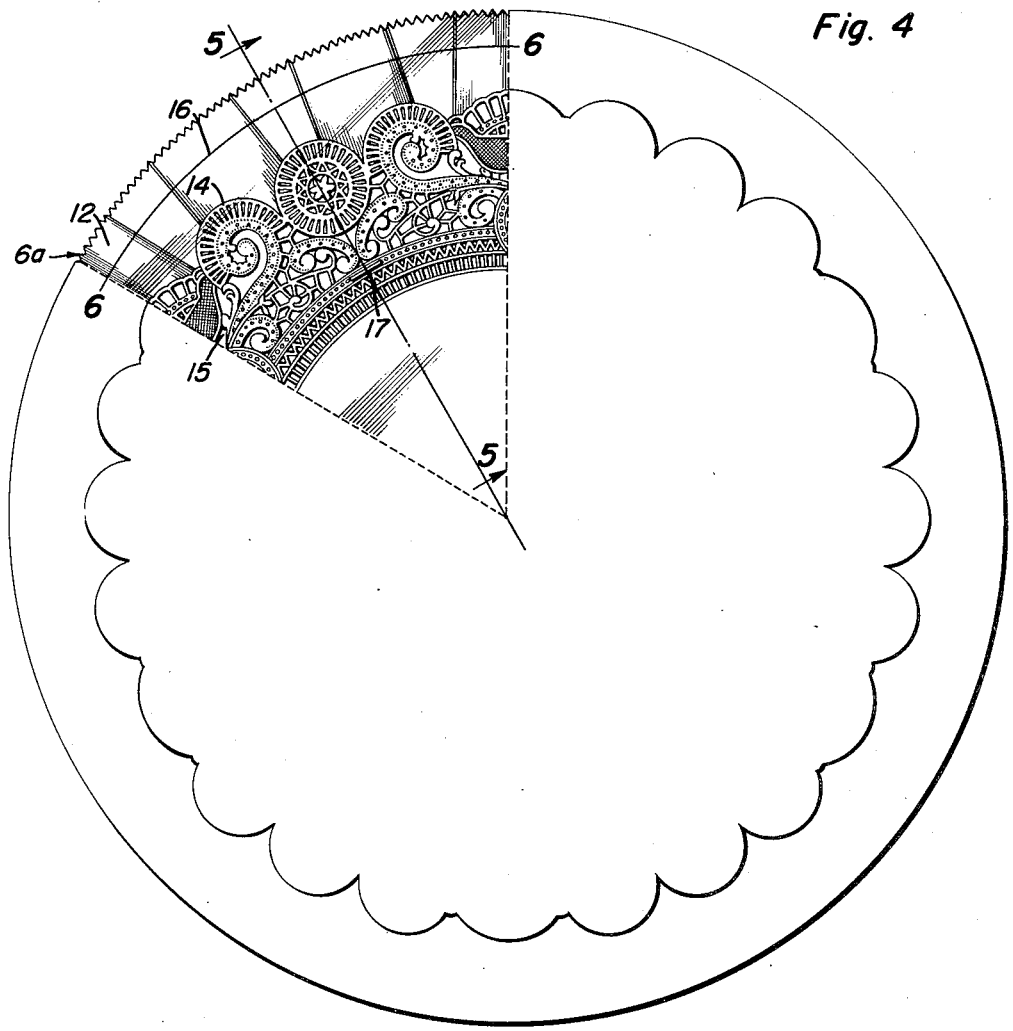
Figure 4 is a view similar to Figure 1, of a modification.
Figure 5:
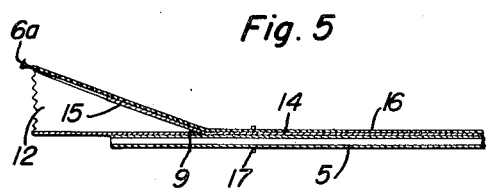
Figure 6:
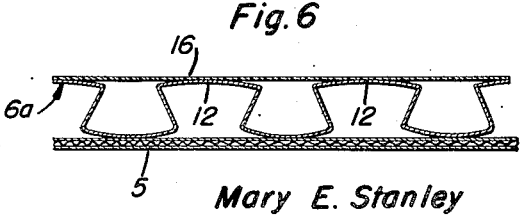

Figures 5 and 6 are sections taken respectively on the line 5—5 and on the line 6—6 of Figure 4.

Figure 1:
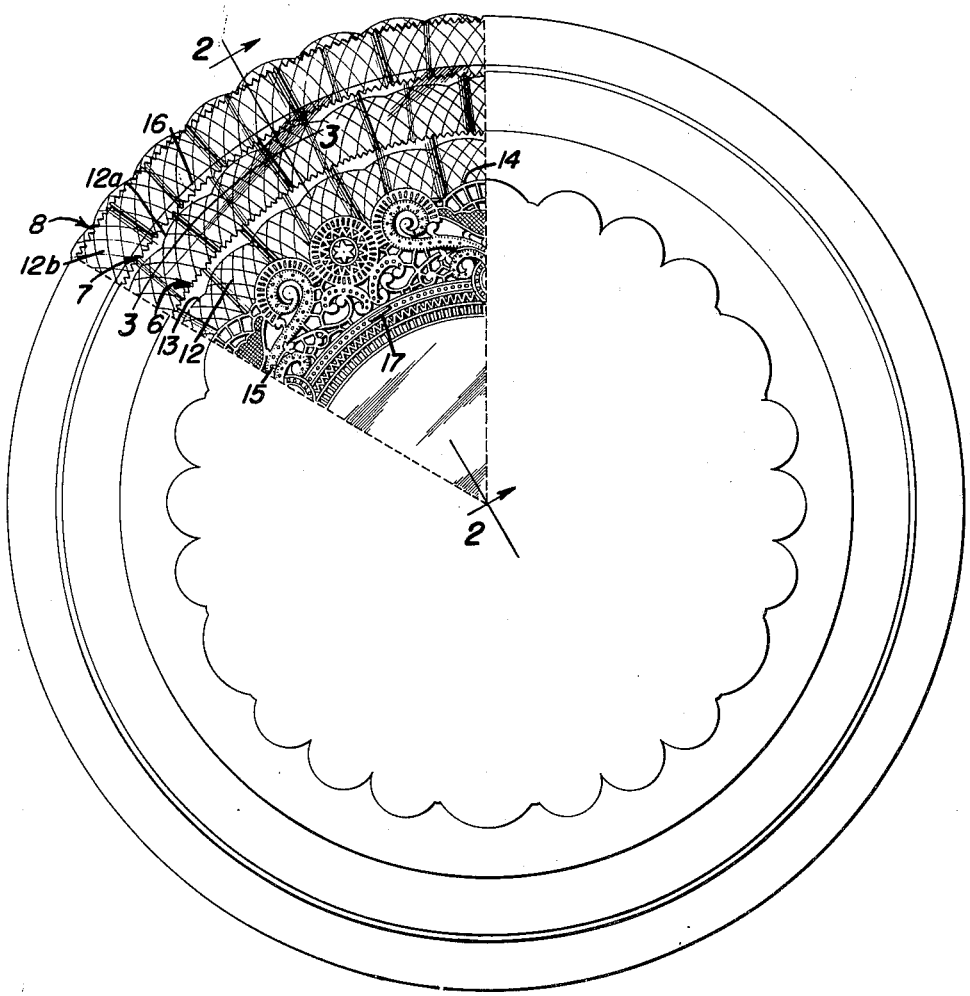
Figure 1 is a top plan view of a platter embodying the present invention, a repeat sector of which is contained between the dotted lines, said repeat sector being repeated throughout the plate.
Figure 2:
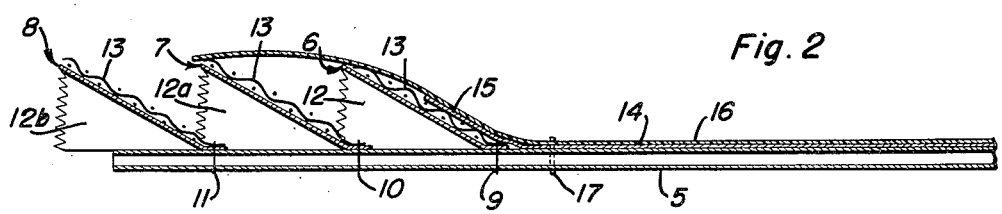
Figure 2 is an enlarged radial section taken on the line 2—2 of Figure 1.
Figure 3:
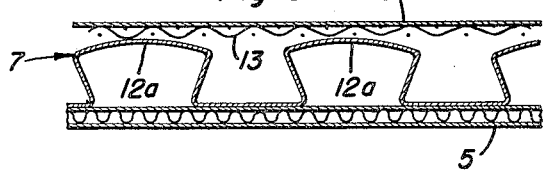
Figure 3 is an enlarged fragmentary section taken on the line 3—3 of Figure 1.

Figure 7 is a view similar to Figure 1, of a further modification.

Figures 8 and 9 are sections taken respectively on the line 8—8 and on the line 9—9 of Figure 7.

Referring in detail to the drawings, 5 indicates a relatively rigid circular base plate which is preferably made of corrugated cardboard. In the form of Fig. 1, a plurality of concentric overlapping circular ruffles 6, 7 and 8 are disposed on the margin of and stitched at their inner edges to the base plate 5 as at 9, 10 and 11. These ruffles have uniformly spaced upstanding box pleats 12, 12a and 12b, and may be made of strips of woven textile fabric. A ruffle 13, made of a strip of colored netting and having flat pleats, is disposed over each of the ruffles 12, 12a and 12b and stitched therewith to the base plate.

A generally circular doily 14, preferably made of paper and having an ornamental perforate marginal portion 15 overlying the inner portions of the ruffle 12 and the ruffle 13 thereon, is secured on the base plate.

A circular sheet of "cellophane" or like pliable transparent plastic material 16 is secured by staples 17 or the like to the base plate, and this sheet covers the doily and the ruffles 12 and 12a and the ruffles 13 thereon. The staples 17 also secure the doily to the base plate.

The upstanding box plaits of the ruffles raise the margins of the doily and the sheet 16 so that the platter has a central depression to retainingly receive the cake and any crumbs thereof.

In the modified forms of Figs. 4 and 7, there is only one ruffle 6a and 6b, respectively, projecting beyond the edge of the base plate like the ruffle 8 of Fig. 1. Also, in these modified forms, the ruffles of netting 13 are not used. Otherwise, the form of Fig. 4 is similar to that of Fig. 1, and remaining similar parts of both forms are indicated by the same reference characters.

In the form of Figure 7, the base plate has a circular flexible tinsel facing sheet 18 secured on and covering the upper surface thereof. Also, the ruffle 6b of this form is made of a resilient tinsel strip having numerous uniformly spaced perforations or openings 19. The bright color of the sheet 18 shows through the perforations 19 and the perforations in the marginal portion 15 of the doily. Many different and attractive color effects can be had by making the ruffles and other parts of desired contrasting colors. Otherwise, the form of Fig. 7 is similar to that of Figs. 1 and 4, and remaining parts of the form of Fig. 7 are indicated by the same numerals as used for similar parts in Figs. 1 and 4.

From the foregoing description, the nature and advantages of the invention will be apparent. Further modifications are contemplated within the spirit of the invention as claimed.

What is claimed as new is:

1. An ornamental cake platter comprising a relatively rigid base plate, a plurality of concentric overlapping ruffles having upstanding box plaits and secured at their inner edges to said base plate adjacent the marginal edge thereof, a paper doily secured on said base plate and having an ornamental perforate margin overlapping the innermost ruffle, and a sheet of pliable transparent plastic secured to said base plate and covering said doily and all of said ruffles except the outermost one.

2. The article of claim 1 wherein the outer edge of the outermost ruffle extends beyond the marginal edge of said base plate.

3. The article of claim 2 and a ruffle of colored netting having flat plaits covering each of said concentric overlapping ruffles and secured at its inner edge to said base plate.

4. The article of claim 1 and a ruffle of colored netting having flat plaits covering each of said concentric overlapping ruffles and secured at its inner edge to said base plate.

5. An ornamental cake platter comprising a relatively rigid base plate, a plurality of concentric overlapping ruffles having upstanding box plaits and secured at their inner edges to said base plate adjacent the marginal edge thereof, a ruffle of colored netting having flat plaits covering each of said concentric overlapping ruffles and secured at its inner edge to said base plate, and a paper doily secured on said base plate and having an ornamental perforate margin overlapping the innermost colored ruffle.

6. The article of claim 5 and a sheet of pliable transparent plastic secured to said base plate and covering said doily and said innermost colored ruffle.

MARY E. STANLEY.

REFERENCES CITED

The following references are of record in the file of this patent:

UNITED STATES PATENTS

| Number | Name | Date |
|---|---|---|
| 1,631,205 | Horner | June 7, 1927 |
| 1,697,751 | Blake | Jan. 1, 1929 |
| 2,482,981 | Kamrass | Sept. 27, 1949 |